United States Patent
Lim et al.

(10) Patent No.: US 9,866,365 B2
(45) Date of Patent: Jan. 9, 2018

(54) RF STRUCTURE OF USER TERMINAL FOR SUPPORTING MULTI-CARRIER AGGREGATION AND VARIOUS COMMUNICATION RADIO ACCESS TECHNOLOGIES

(71) Applicant: LG ELECTRONICS INC., Seoul (KR)

(72) Inventors: Suhwan Lim, Seoul (KR); Manyoung Jung, Seoul (KR); Byongyol Lee, Seoul (KR); Sangwook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 133 days.

(21) Appl. No.: 14/648,593

(22) PCT Filed: Nov. 7, 2013

(86) PCT No.: PCT/KR2013/010063
§ 371 (c)(1),
(2) Date: May 29, 2015

(87) PCT Pub. No.: WO2014/088218
PCT Pub. Date: Jun. 12, 2014

(65) Prior Publication Data
US 2015/0318975 A1 Nov. 5, 2015

Related U.S. Application Data

(60) Provisional application No. 61/732,409, filed on Dec. 3, 2012.

(51) Int. Cl.
*H04L 5/14* (2006.01)
*H04B 1/00* (2006.01)
(Continued)

(52) U.S. Cl.
CPC ............ *H04L 5/14* (2013.01); *H04B 1/0057* (2013.01); *H04B 1/0064* (2013.01); *H04L 5/001* (2013.01);
(Continued)

(58) Field of Classification Search
None
See application file for complete search history.

(56) References Cited

U.S. PATENT DOCUMENTS

2006/0281423 A1* 12/2006 Caimi .................... H01Q 9/045
455/129
2008/0055164 A1 3/2008 Zhang et al.
(Continued)

FOREIGN PATENT DOCUMENTS

KR 10-2011-0108417 A 10/2011
KR 10-2012-0033760 A 4/2012

*Primary Examiner* — Eunsook Choi
(74) *Attorney, Agent, or Firm* — Dentons US LLP

(57) ABSTRACT

According to one embodiment of the present specification, a user terminal is provided. The user terminal can comprise: a tunable antenna capable of adjusting a band; a diplexer connected to the tunable antenna to synthesize and separate sub-carriers; one or more antenna switches connected to the diplexer to synthesize and separate low-band sub-carriers and middle-band and high-band sub-carriers; and a sub-carrier processing unit connected to the one or more antenna switches to synthesize and separate a plurality of low-band sub-carriers, a plurality of middle-band sub-carriers and a plurality of high-band sub-carriers. A low-noise amplifier can be connected to the sub-carrier processing unit in order to prevent an increase in a reception sensitivity loss and a noise index occurring on a reception path of the diplexer, the one or more antenna switches and the sub-carrier processing unit.

10 Claims, 16 Drawing Sheets

(51) Int. Cl.
*H04W 76/04* (2009.01)
*H04W 72/04* (2009.01)
*H04L 5/00* (2006.01)
*H04L 27/26* (2006.01)
*H01Q 5/335* (2015.01)

(52) U.S. Cl.
CPC ..... *H04L 27/2626* (2013.01); *H04W 72/0453* (2013.01); *H04W 76/046* (2013.01); *H01Q 5/335* (2015.01)

(56) References Cited

U.S. PATENT DOCUMENTS

| | | | |
|---|---|---|---|
| 2011/0103243 A1 | 5/2011 | Larsson et al. | |
| 2013/0016633 A1* | 1/2013 | Lum | H04B 1/0057 370/277 |
| 2013/0325149 A1* | 12/2013 | Manssen | G05B 13/02 700/37 |
| 2014/0092795 A1* | 4/2014 | Granger-Jones | H04L 5/08 370/297 |
| 2014/0334362 A1* | 11/2014 | Granger-Jones | H04L 5/08 370/297 |

* cited by examiner

RF STRUCTURE OF USER TERMINAL FOR SUPPORTING MULTI-CARRIER AGGREGATION AND VARIOUS COMMUNICATION RADIO ACCESS TECHNOLOGIES

This application is a 35 U.S.C. §371 National Stage Entry of International Application No. PCT/KR2013/010063 filed Nov. 7, 2013, which claims benefit of and priority to U.S. Provisional Application No. 61/732,409 filed Dec. 2, 2012, both of which are incorporated by reference for all purposes as if fully set forth herein.

BACKGROUND OF THE INVENTION

Field of the Invention

A disclosure of this specification relates to the RF structure of a terminal supporting all of an inter-band carrier aggregation, an intra-band carrier aggregation, and various radio access technologies.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. To understand OFDMA, OFDM should be known. OFDM may attenuate inter-symbol interference with low complexity and is in use. OFDM converts data serially input into N parallel data pieces and carries the data pieces over N orthogonal sub-carriers. The sub-carriers maintain orthogonality in view of frequency. Meanwhile, OFDMA refers to a multiple access scheme that realizes multiple access by independently providing each user with some of sub-carriers available in the system that adopts OFDM as its modulation scheme.

Recently, the development of 3GPP LTE-A (LTE-Advanced), that is, the evolution of 3GPP LTE, has been completed.

In accordance with the LTE-A, a Carrier Aggregation (CA) technology in which a plurality of bands is grouped into one has been proposed. The CA technologies, as described above, may be generally separated into an inter-band CA technology and an intra-band CA technology. The inter-band CA is a method of aggregating and using Component Carriers (CCs) that are present in different bands, and the intra-band CA is a method of aggregating and using CCs in the same frequency band.

However, in the design of the RF structure of a user terminal, to support all of the intra-band CA, the inter-band CA, and existing several radio access technologies was impossible because the implementation of the intra-band CA, the inter-band CA, and existing several radio access technologies is very complicated.

Furthermore, if both the intra-band CA and the inter-band CA are implemented, there is a problem in that transmission power and reception sensitivity are reduced due to additional several devices.

SUMMARY OF THE INVENTION

Accordingly, an object of one disclosure of this specification is to propose an RF structure capable of simultaneously supporting an intra-band carrier aggregation, an inter-band carrier aggregation, and existing 2G/3G communication technologies so that.

Furthermore, an object of another disclosure of this specification is to solve a problem in that transmission power and reception sensitivity are reduced due to additional several devices.

In order to achieve the above object, one disclosure of this specification provides a terminal, comprising: a band-adjustable tunable antenna; a diplexer which is connected to the tunable antenna and aggregates and separates subcarriers; one or more antenna switches which are connected to the diplexer and aggregate and separate low band subcarriers and middle band and high band subcarriers; a subcarrier processing unit which is connected to the one or more antenna switch and aggregates and separates several subcarriers of a low band, several subcarriers of a middle band, and several subcarriers of a high band. A low noise amplifier is connected to the subcarrier processing unit in order to prevent a loss of reception sensitivity and an increase of a noise figure generated on a reception path of the diplexer, the one or more antenna switches, and the subcarrier processing unit.

In order to achieve the above object, another disclosure of this specification is a terminal, comprising: a band-adjustable tunable antenna; a diplexer which is connected to the tunable antenna and aggregates and separates subcarriers; a first antenna switch which is connected to the diplexer and aggregates and separates low band subcarriers and middle band and high band subcarriers; a second antenna switch which is connected to the diplexer and selects middle band and the high band subcarriers; a low band subcarrier processing unit which is connected to the first antenna switch and aggregates and separates several subcarriers of a low band; a middle band subcarrier processing unit which is connected to the second antenna switch and aggregates and separates several subcarriers of a middle band; and a high band subcarrier processing unit which is connected to the second antenna switch and aggregates and separates several subcarriers of a high band. A low noise amplifier is connected to the low band subcarrier processing unit in order to prevent a loss of reception sensitivity and an increase of a noise figure generated on a reception path of the diplexer, the first antenna switch, and the subcarrier processing unit. Also, a low noise amplifier is connected to the middle band subcarrier processing unit or the high band subcarrier processing unit in order to prevent a loss of reception sensitivity and an increase of a noise figure generated on a reception path of the diplexer, the second antenna switch, and the middle band subcarrier processing unit or the high band subcarrier processing unit.

The low band subcarrier processing unit comprises: a low band duplexer which is connected to the first antenna switch and aggregates and separates a transmission and reception of a first low band subcarrier; and a low band quadplexer which is connected to the first antenna switch, aggregates and separates a second low band subcarrier and a third low band subcarrier, and aggregates and separates transmission and reception.

The middle band subcarrier processing unit comprises: a middle band the duplexer which is connected to the second antenna switch and aggregates and separates a transmission and reception of a first middle band subcarrier; and a middle band quadplexer which is connected to the second antenna switch, aggregates and separates a second middle band subcarrier and a third middle band subcarrier, and aggregates and separates transmission and reception.

The high band subcarrier processing unit comprises: a high band duplexer which is connected to the second antenna switch and aggregates and separates a transmission and reception of a first high band subcarrier; and a high band quadplexer which is connected to the second antenna switch, aggregates and separates a second high band subcarrier and a third high band subcarrier, and aggregates and separates transmission and reception.

The terminal may further comprise: a middle band and high band subcarrier simultaneous processing unit which is connected to the second antenna switch and aggregates and separates subcarriers of a middle band and subcarriers of a high band. The middle band and high band subcarrier simultaneous processing unit may comprise a middle/high band quadplexer which is connected to the second antenna switch, aggregates and separates a third middle band subcarrier and a second high band subcarrier, and aggregates and separates transmission and reception. The terminal may further comprise: a first selection switch which selects any one of third middle band subcarriers by the middle band quadplexer and third middle band subcarriers by the middle/high band quadplexer; and a second selection switch which selects any one of second high band subcarriers by the high band quadplexer and second high band subcarriers by the middle/high band quadplexer.

One or more of the low band quadplexer, the middle band quadplexer, and the high band quadplexer comprise: a diplexer; and at least two duplexers connected to the diplexer. The low noise amplifier may be connected to an output lint for a reception signal of the duplexer within the quadplexer, a filter may be connected to the low noise amplifier, and a power amplifier may be connected to an input line for a transmission signal of the duplexer within the quadplexer.

One or more of the low band quadplexer, the middle band quadplexer, and the high band quadplexer may comprise: a diplexer; and at least two filters connected to the diplexer. The low noise amplifier may be connected to a front end of the diplexer within the quadplexer, and a power amplifier is connected to an input line for a transmission signal of a filter within the quadplexer In accordance with one disclosure of this specification, the proposed RF structure may support all of an intra-band CA, an inter-band CA, and various existing radio access technologies. Furthermore, in accordance with another disclosure of this specification, a problem in that a reduction of transmission power and reception sensitivity for added RF devices (a diplexer, a quadplexer, and a harmonic filter) can be solved.

DESCRIPTION OF EXEMPLARY EMBODIMENTS

Figure 1:
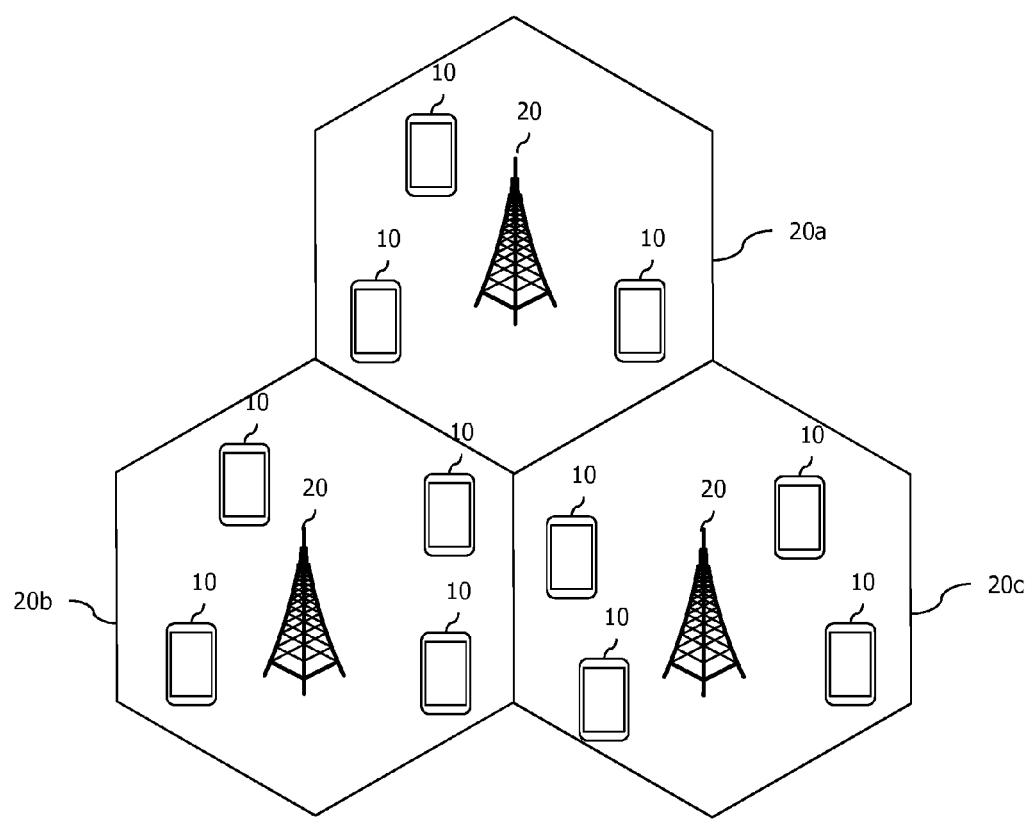
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

Hereinafter, in the drawings, UE (User Equipment) has been illustrated. However, the UE may also be called a terminal, ME (Mobile Equipment), an MS (Mobile Station), a UT (User Terminal), an SS (Subscriber Station), a wireless device, a handheld device, or an AT (Access Terminal). Furthermore, the UE may be a portable device equipped with a communication function, such as a mobile phone, a PDA, a smart phone, a wireless modem, or a laptop, or may be a device that is unable to be carried, such as a PC or a device mounted on a vehicle.

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors). A terminal (user equipment, UE) 10 may be fixed or movable and may be called other terms such as a mobile station (MS), a mobile terminal (MT), a user terminal (UT), a subscriber station (SS), a wireless device, a personal digital assistant (PDA), a wireless modem, a handheld device, and the like. The base station 20 generally represents a fixed station that communicates with the terminal 10, and may be called different terms such as an evolved-NodeB (eNB), a base transceiver system (BTS), an access point, and the like.

The terminal generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the terminal.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
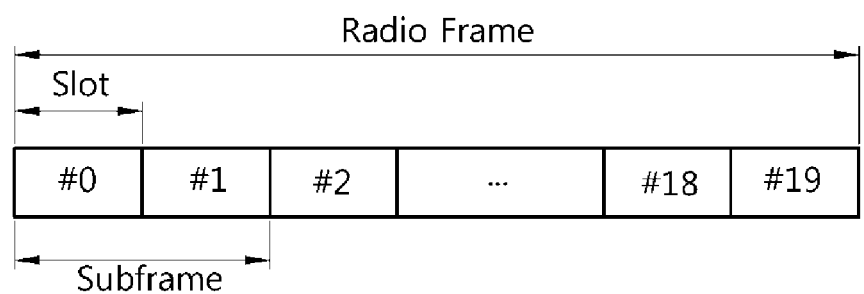
FIG. 2 shows a downlink radio frame structure according to FDD of 3rd generation partnership project (3GPP) long term evolution (LTE).

FIG. 2 shows a downlink radio frame structure according to FDD of 3rd generation partnership project (3GPP) long term evolution (LTE).

Referring to FIG. 2, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Figure 3:
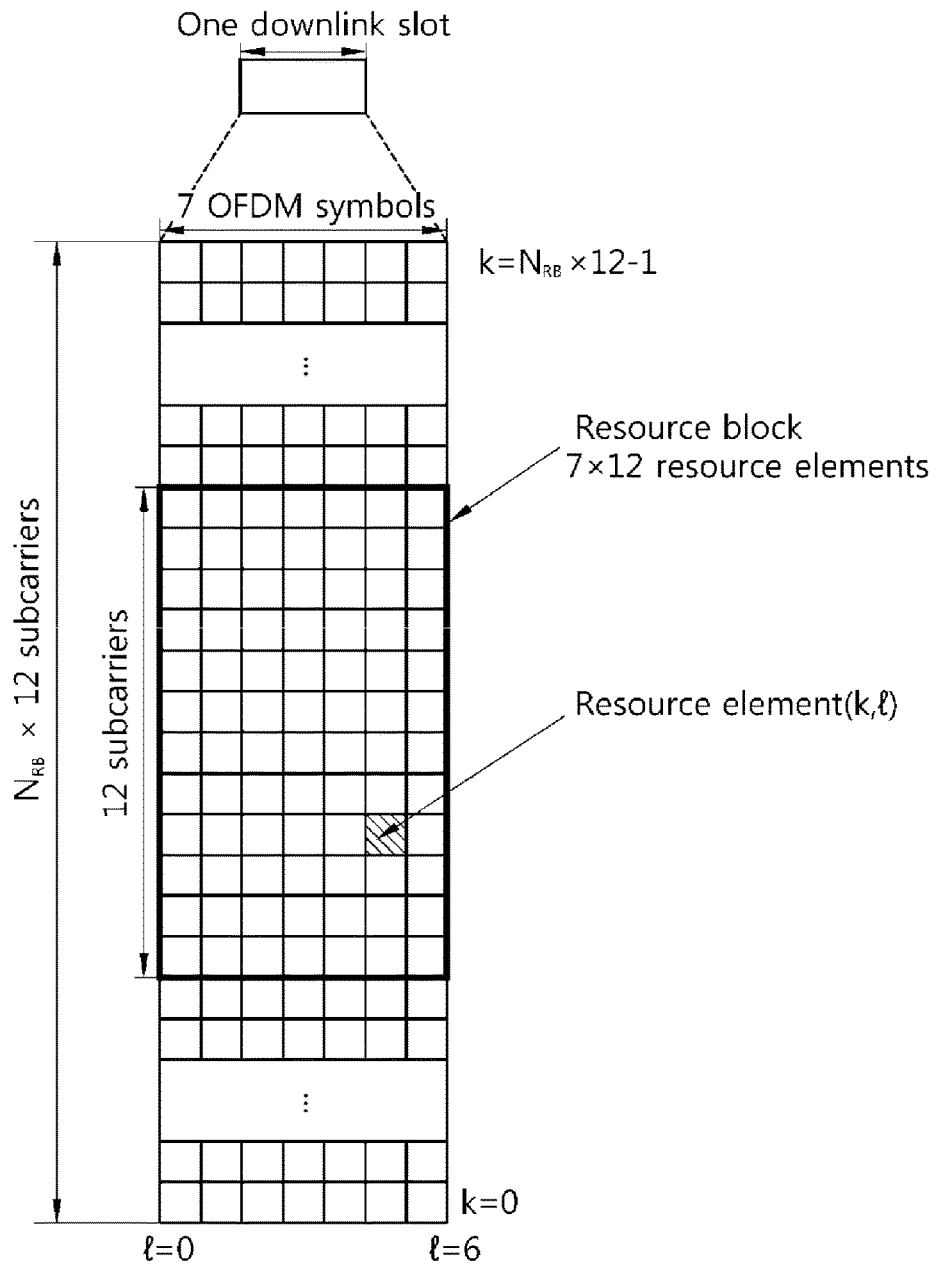
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, an uplink slot includes a plurality of OFDM (orthogonal frequency division multiplexing) slice boundary in the time domain and NUL reference blocks (RBs) in the frequency domain. The OFDM symbol is to represent one symbol period, and depending on systems, may be denoted an SC-FDMA symbol, OFDMA symbol, or symbol period. The resource block is the unit of resource allocation and includes a plurality of sub-carriers in the frequency domain. The number, NUL, of resource blocks included in the uplink slot, depends upon an uplink transmission bandwidth configured in a cell. Each element over a resource grid is denoted a resource element.

Here, although one resource block includes 7×12 resource elements comprising seven OFDM symbols in the time domain and 12 sub-carriers in the frequency domain, as an example, the number of sub-carriers in the resource block and the number of OFDM symbols are not limited thereto. The number of OFDM symbols or the number of sub-carriers included in the resource block may change in various ways. The number of OFDM symbols may vary depending on the length of a cyclic prefix (hereinafter, "CP"). For example, in the case of normal CP, the number of OFDM symbols is 7, and in the case of extended CP, the number of OFDM symbols is 6.

In 3GPP LTE, the resource grid for one uplink slot shown in FIG. 3 may also apply to the resource grid for the downlink slot.

Figure 4:
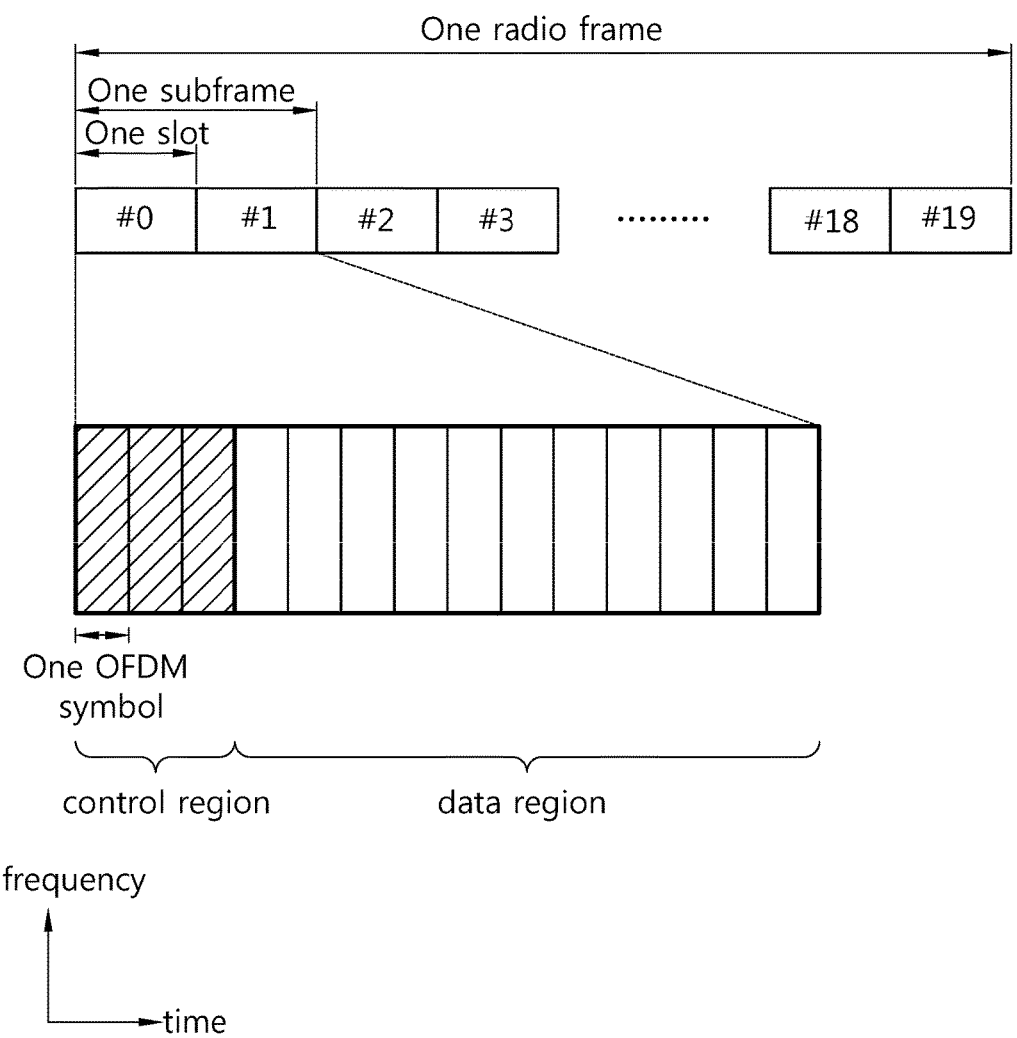
FIG. 4 illustrates the architecture of a downlink sub-frame.

FIG. 4 illustrates the architecture of a downlink sub-frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

Although one slot includes seven OFDM symbols for example, the number of OFDM symbols included in one slot may vary depending on the length of the CP (Cyclic Prefix). According to 3GPP TS 36.211 V10.4.0, in the case of normal CP, one slot includes seven OFDM symbols, and in the case of extended CP, one slot includes six OFDM symbols.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 5:
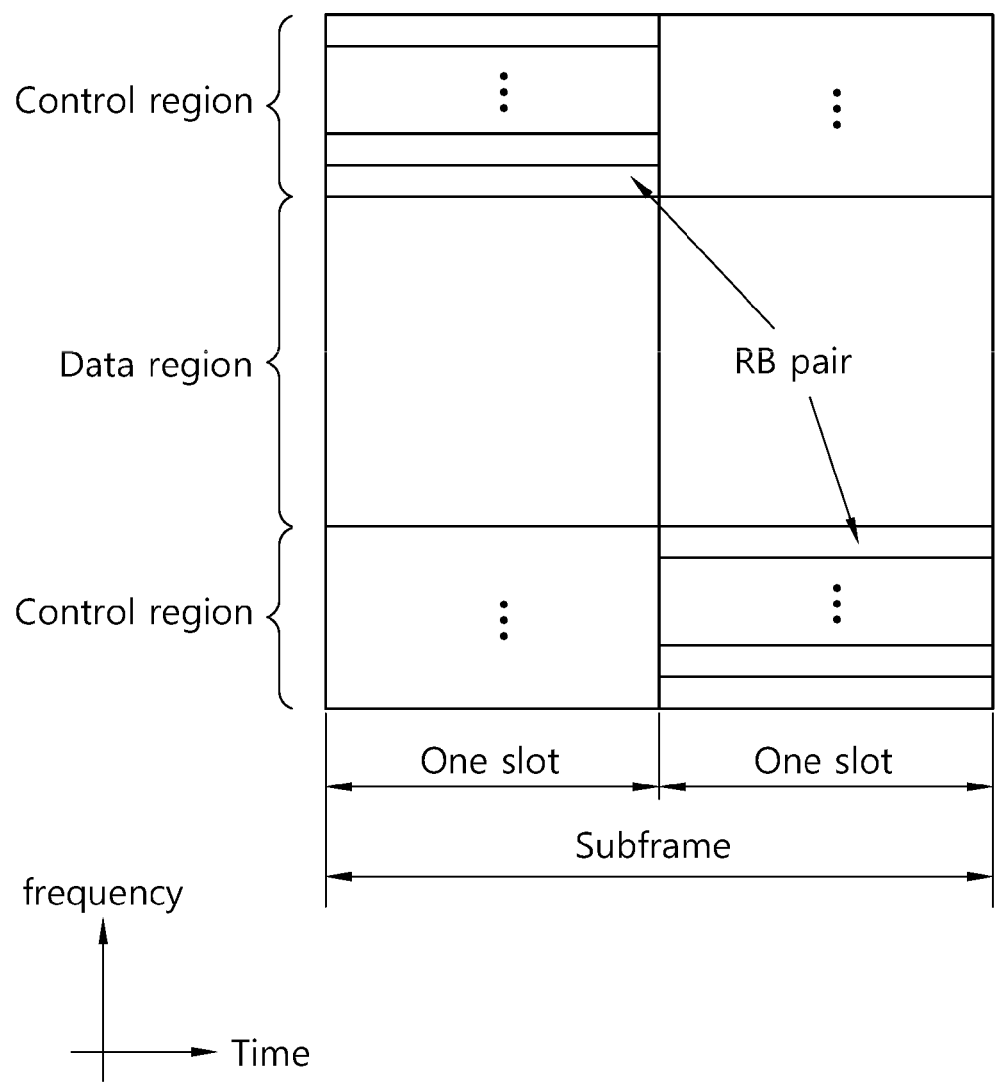
FIG. 5 illustrates the architecture of a UL sub-frame in 3GPP LTE.

FIG. 5 illustrates the architecture of a UL sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one user equipment is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary. A frequency diversity gain may be obtained by transmitting uplink control information through different sub-carriers over time.

Figure 6:
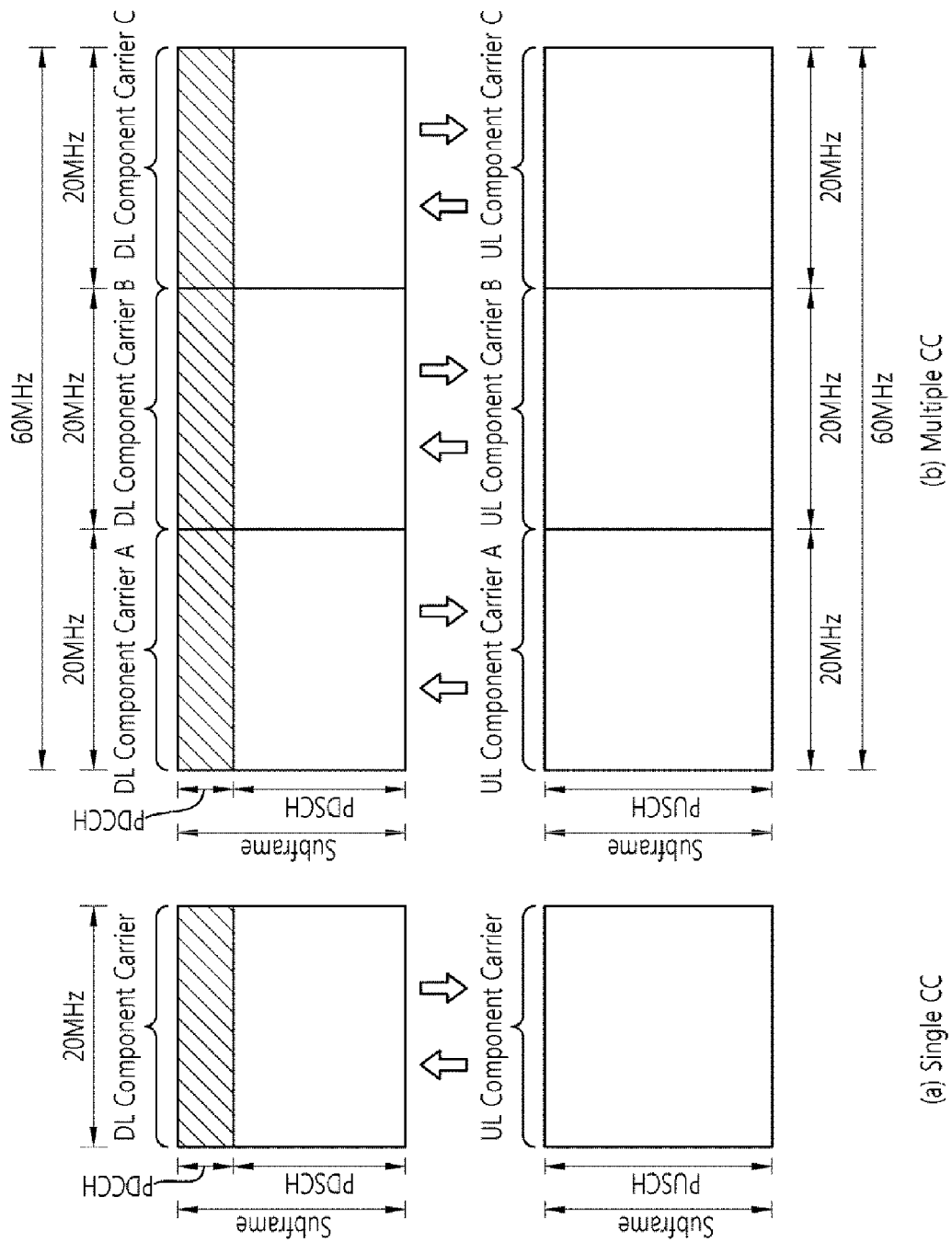
FIG. 6 illustrates an example of comparison between an existing single carrier system and a carrier aggregation system.

FIG. 6 illustrates an example of comparison between an existing single carrier system and a carrier aggregation system.

Referring to FIG. 6(a), a typical FDD wireless communication system supports one carrier for uplink and downlink. In this case, the carrier may have various bandwidths, but only one carrier is assigned to the user equipment.

In other words, in the typical FDD wireless communication system, data transmission and reception is carried out through one downlink band and one uplink band corresponding thereto. The bit stream and the user equipment transmit and receive control information and/or data scheduled for each sub-frame. The data is transmitted/received through the data region configured in the uplink/downlink sub-frame, and the control information is transmitted/received through the control region configured in the uplink/downlink sub-frame. For this, the uplink/downlink sub-frame carries signals through various physical channels. Although the description in connection with FIG. 6 primarily focuses on the FDD scheme for ease of description, the foregoing may be applicable to the TDD scheme by separating the radio frame for uplink/downlink in the time domain.

As shown in FIG. 6(a), data transmission/reception performed through one downlink band and one uplink band corresponding to the downlink band is referred to as a single carrier system.

Such single carrier system may correspond to an example of communication in the LTE system. Such 3GPP LTE system may have an uplink bandwidth and a downlink bandwidth that differ from each other, but supports up to 20 MHz.

Meanwhile, a high data transmission rate is demanded. The most fundamental and stable solution to this is to increase bandwidth.

However, the frequency resources are presently saturated, and various technologies are partially being in use in a wide range of frequency band. For such reason, as a method for securing a broad bandwidth to satisfy the demand for higher data transmission rate, each scattered band may be designed to meet basic requirements for being able to operate an independent system, and carrier aggregation (CA) whose concept is to bundle up multiple bands to a single system has been introduced.

That is, the carrier aggregation (CA) system means a system that constitutes a broadband by gathering one or more carriers each of which has a bandwidth narrower than the targeted broadband when supporting a broadband in the wireless communication system.

Such carrier aggregation (CA) technology is also adopted in the LTE-advanced (hereinafter, 'LTE-A'). The carrier aggregation (CA) system may also be referred to as a multiple-carrier system or bandwidth aggregation system.

In the carrier aggregation (CA) system, a user equipment may simultaneously transmit or receive one or more carriers depending on its capabilities. That is, in the carrier aggregation (CA) system, a plurality of component carriers (CCs) may be assigned to a user equipment. As used herein, the term "component carrier" refers to a carrier used in a carrier aggregation system and may be abbreviated to a carrier. Further, the term "component carrier" may mean a frequency block for carrier aggregation or a center frequency of a frequency block in the context and they may be interchangeably used.

FIG. 6(b) may correspond to a communication example in an LTE-A system.

Referring to FIG. 6(b), in case, e.g., three 20 MHz component carriers are assigned to each of uplink and downlink, the user equipment may be supported with a 60 MHz bandwidth. Or, for example, if five CCs are assigned as granularity of the unit of carrier having a 20 MHz bandwidth, up to 100 MHz may be supported. FIG. 6(b) illustrates an example in which the bandwidth of an uplink component carrier is the same as the bandwidth of a downlink component carrier for ease of description. However, the bandwidth of each component carrier may be determined independently. When aggregating one or more component carriers, a targeted component carrier may utilize the bandwidth used in the existing system for backward compatibility with the existing system. For example, in a 3GPP LTE system, bandwidths of 1.4 MHz, 3 MHz, 5 MHz, 10 MHz, 15 MHz and 20 MHz may be supported. Accordingly, the bandwidth of an uplink component carrier may be constituted like 5 MHz (UL CC0)+20 MHz (UL CC1)+20 MHz (UL CC2)+20 MHz (UL CC3)+5 MHz (UL CC4), for example. However, without consideration of backward compatibility, a new bandwidth may be defined rather the existing system bandwidth being used, to constitute a broadband.

FIG. 6(b) illustrates an example in which the number of uplink component carriers is symmetric with the number of downlink component carriers for ease of description. As such, when the number of uplink component carriers is the same as the number of downlink component carriers is denoted symmetric aggregation, and when the number of uplink component carriers is different from the number of downlink component carriers is denoted asymmetric aggregation.

The asymmetric carrier aggregation may occur due to a restriction on available frequency bands or may be artificially created by a network configuration. As an example, even when the entire system band comprises N CCs, the frequency band where a particular user equipment may perform reception may be limited to M (<N) CCs. Various parameters for carrier aggregation may be configured cell-specifically, UE group-specifically, or UE-specifically.

Meanwhile, carrier aggregation systems may be classified into contiguous carrier aggregation systems where each carrier is contiguous with another and non-contiguous carrier aggregation systems where each carrier is spaced apart from another. A guard band may be present between the carriers in the contiguous carrier aggregation system. Hereinafter, simply referring to a multi-carrier system or carrier aggregation system should be understood as including both when component carriers are contiguous and when component carriers are non-contiguous.

Meanwhile, the concept of cell as conventionally appreciated is varied by the carrier aggregation technology. In other words, according to the carrier aggregation technology, the term "cell" may mean a pair of a downlink frequency resource and an uplink frequency resource. Or, the cell may mean a combination of one downlink frequency resource and an optional uplink frequency resource.

In other words, according to the carrier aggregation technology, one DL CC or a pair of UL CC and DL CC may correspond to one cell. Or, one cell basically includes one DL CC and optionally includes a UL CC. Accordingly, a user equipment communicating with a bit stream through a plurality of DL CCs may be said to receive services from a plurality of serving cells. In this case, although downlink is constituted of a plurality of DL CCs, uplink may be used by only one CC. In such case, the user equipment may be said to receive services from a plurality of serving cells for downlink and to receive a service from only one serving cell for uplink.

Meanwhile, in order for packet data to be transmitted/received through a cell, configuration for a particular cell should be completed. Here, the term "configuration" means the state where system information necessary for data transmission/reception on a corresponding cell is completely received. For example, the configuration may include the overall process of receiving common physical layer parameters necessary for data transmission/reception, MAC (media access control) layer parameters, or parameters necessary for a particular operation in RRC layer. The configuration-completed cell is in the state where packet transmission/reception is possible simply when information indicating that packet data may be transmitted is received.

The configuration-completed cell may be left in activation or deactivation state. Here, the term "activation" refers to data transmission or reception being performed or being ready. The UE may monitor or receive a control channel (PDCCH) or data channel (PDSCH) of an activated cell in order to identify resources (which may be frequency or time) assigned thereto.

Transmission or reception with a deactivated cell is impossible, while measurement or transmission/reception of least information is possible. The user equipment may receive system information (SI) necessary for receiving packets from a deactivated cell. In contrast, the user equipment does not monitor or receive the control channel (PDCCH) and data channel (PDSCH) of deactivated cells to identify resources (which may be frequency or time) assigned thereto.

In accordance with carrier aggregation technology, thus, activation/deactivation of a component carrier may be the same in concept as activation/deactivation of a serving cell. For example, assuming that serving cell 1 comprises DL CC1, activation of serving cell 1 means activation of DL CC1. Assuming that serving cell 2 is configured so that DL CC2 is connected with UL CC2, activation of serving cell 2 means activation of DL CC2 and UL CC2. In that regard, each component carrier may correspond to a serving cell.

On the other hand, a change in the concept of serving cell as conventionally understood by the carrier aggregation technology leads to primary cells and secondary cells being separated from each other.

The primary cell refers to a cell operating in a primary frequency and means a cell where the user equipment performs an initial connection establishment procedure or connection re-establishment procedure with a bit stream or a cell designated so during the course of handover.

The secondary cell means a cell operating in a secondary frequency, and is configured once an RRC connection is established and is used to provide additional radio resources.

The PCC (primary component carrier) means a component carrier (CC) corresponding to the primary cell. The PCC means a CC where the user equipment initially achieves connection (or RRC connection) with the base station among various CCs. The PCC is a special CC that is in charge of connection (or RRC connection) for signaling regarding multiple CCs and that manages UE context that is connection information relating to the UE. Further, the PCC, in case the PCC achieves connection with the UE so that it is in RRC connected mode, always remains in activated state. The downlink component carrier corresponding to the primary cell is referred to as a downlink primary component carrier (DL PCC), and the uplink component carrier corresponding to the primary cell is referred to as an uplink primary component carrier (UL PCC).

The SCC (secondary component carrier) means a CC corresponding to the secondary cell. That is, the SCC is a CC assigned to the user equipment, which is not the PCC, and the SCC is an extended carrier for the user equipment to assign additional resources other than the PCC. The SCC may stay in activated state or deactivated state. The downlink component carrier corresponding to the secondary cell is referred to as a downlink secondary component carrier (DL SCC), and the uplink component carrier corresponding to the secondary cell is referred to as an uplink secondary component carrier (UL SCC).

The primary cell and the secondary cell have the following features.

First, the primary cell is used for transmission of a PUCCH. Second, the primary cell always remain activated while the secondary cell switches between activation/deactivation depending on particular conditions. Third, when the primary cell experiences radio link failure (hereinafter, "RLF"), the RRC reconnection is triggered. Fourth, the primary cell may be varied by a handover procedure that comes together with security key changing or an RACH (Random Access CHannel) procedure. Fifth, NAS (non-access stratum) information is received through the primary cell. Sixth, in the case of an FDD system, the primary cell is constituted of a pair of DL PCC and UL PCC. Seventh, a different component carrier may be set as the primary cell for each user equipment. Eighth, primary cells may be exchanged only by a handover, cell selection/cell reselection process. In adding a new secondary cell, RRC signaling may be used to transmit system information of the dedicated secondary cell.

As described above, the carrier aggregation system may support a plurality of component carriers (CCs), i.e., a plurality of serving cells, unlike the single carrier system.

Such carrier aggregation system may support cross-carrier scheduling. The cross-carrier scheduling is a scheduling method that allows for resource allocation of a PDSCH transmitted through other component carrier through a PDCCH transmitted through a particular component carrier and/or resource allocation of a PUSCH transmitted through other component carrier than the component carrier basically linked with the particular component carrier. That is, a PDCCH and a PDSCH may be transmitted through different downlink CCs, and a PUSCH may be transmitted through an uplink CC other than an uplink CC linked with a downlink CC through which a PDCCH including a UL grant is transmitted. As such, the cross-carrier scheduling-supportive system requires a carrier indicator indicating a DL CC/UL CC through which a PDSCH/PUSCH through which a PDCCH provides control information is transmitted. The field containing such carrier indicator is hereinafter referred to as a carrier indication field (CIF).

The carrier aggregation system supportive of cross-carrier scheduling may include a carrier indication field (CIF) in the conventional DCI (downlink control information) format. A cross-carrier scheduling-supportive system, e.g., an LTE-A system, adds a CIF to the existing DCI format (i.e., DCI format used in LTE), so that it may be extended with three bits, and it may reuse the existing coding scheme, resource allocation scheme (i.e., CCE-based resource mapping) for the PDCCH structure.

Figure 7:
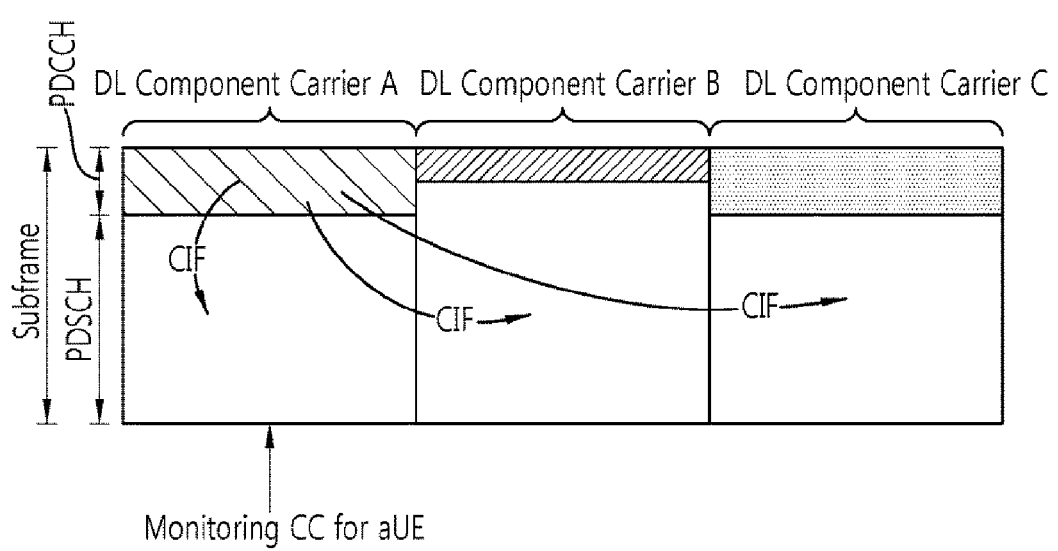
FIG. 7 exemplifies cross-carrier scheduling in the carrier aggregation system.

FIG. 7 exemplifies cross-carrier scheduling in the carrier aggregation system.

Referring to FIG. 7, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 7 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

The CIF value is the same as the serving cell index value. The serving cell index is transmitted to the UE through an RRC signal. The serving cell index includes a value for identifying a serving cell, i.e., a first cell (primary cell) or a second cell (secondary cell). For example, 0 may represent a first cell (primary cell).

Meanwhile, the carrier aggregation (CA) technologies, as described above, may be generally separated into an inter-band CA technology and an intra-band CA technology. The inter-band CA is a method that aggregates and uses CCs that are present in different bands from each other, and the intra-band CA is a method that aggregates and uses CCs in the same frequency band. Further, CA technologies are more specifically split into intra-band contiguous CA, intra-band non-contiguous CA, and inter-band non-contiguous CA.

Figure 8A:
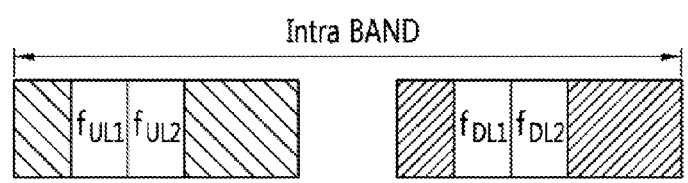
FIGS. 8a and 8b are a conceptual view illustrating intra-band carrier aggregation (CA).
Figure 8B:
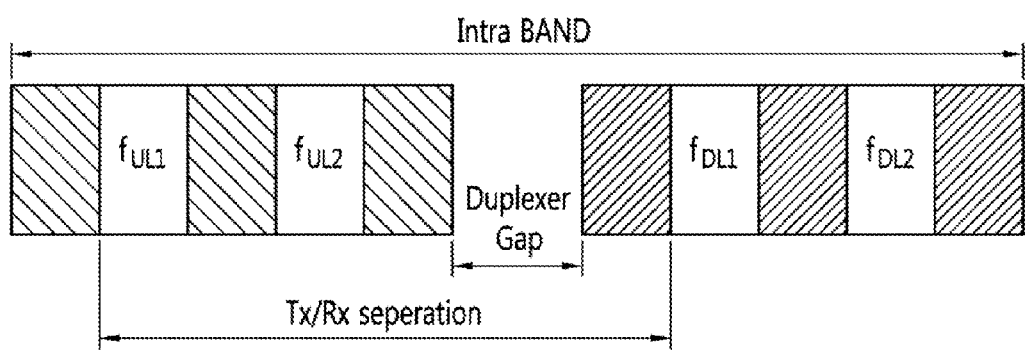

FIGS. 8a and 8b are a conceptual view illustrating intra-band carrier aggregation (CA).

FIG. 8a illustrates intra-band contiguous CA, and FIG. 8b illustrates intra-band non-contiguous CA.

LTE-advanced adds various schemes including uplink MIMO and carrier aggregation in order to realize high-speed wireless transmission. The CA that is being discussed in LTE-advanced may be split into the intra-band contiguous CA shown in FIG. 8a and the intra-band non-contiguous CA shown in FIG. 8b.

Figure 9A:
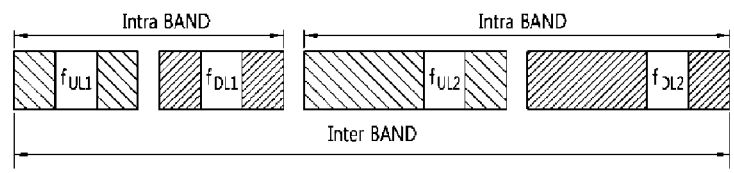
FIGS. 9a and 9b are conceptual views illustrating inter-band carrier aggregation.
Figure 9B:
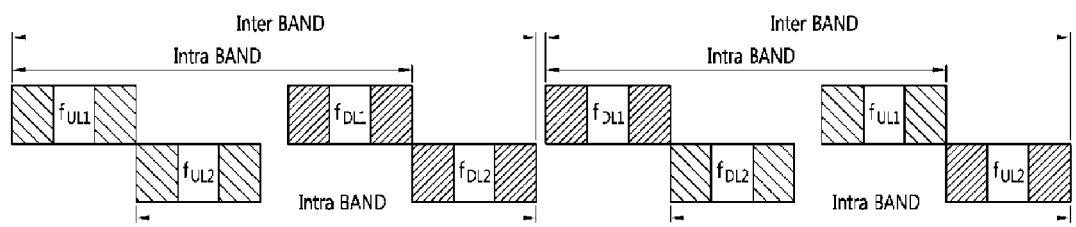

FIGS. 9a and 9b are conceptual views illustrating inter-band carrier aggregation.

FIG. 9a illustrates a combination of a lower band and a higher band for inter-band CA, and FIG. 9b illustrates a combination of similar frequency bands for inter-band CA.

In other words, the inter-band carrier aggregation may be separated into inter-band CA between carriers of a low band and a high band having different RF characteristics of inter-band CA as shown in FIG. 9a and inter-band CA of similar frequencies that may use a common RF terminal per component carrier due to similar RF (radio frequency) characteristics as shown in FIG. 9b.

TABLE 1

| Operating Band | (Uplink (UL) operating band) $F_{UL\_low}$-$F_{UL\_high}$ | Downlink (DL) operating band $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 61 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| 30 | 2305-2315 | 2350-2360 | FDD |
| 31 | 452.5-457.5 | 462.5-467.5 | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |

TABLE 1-continued

| Operating Band | (Uplink (UL) operating band) $F_{UL\_low}$-$F_{UL\_high}$ | Downlink (DL) operating band $F_{DL\_low}$-$F_{DL\_high}$ | Duplex Mode |
|---|---|---|---|
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

Meanwhile, the 3GPP LTE/LTE-A systems define operating bands for uplink and downlink as shown in Table 1 above. Four CA cases shown in FIGS. 8a, 8b, 9a and 9b come from Table 1.

Here, $F_{UL\_low}$ means the lowest frequency in the uplink operating bands. $F_{UL\_high}$ means the highest frequency in the uplink operating bands. Further, $F_{DL\_low}$ means the lowest frequency in the downlink operating bands, and $F_{DL\_high}$ means the highest frequency in the downlink operating bands.

Figure 10A:
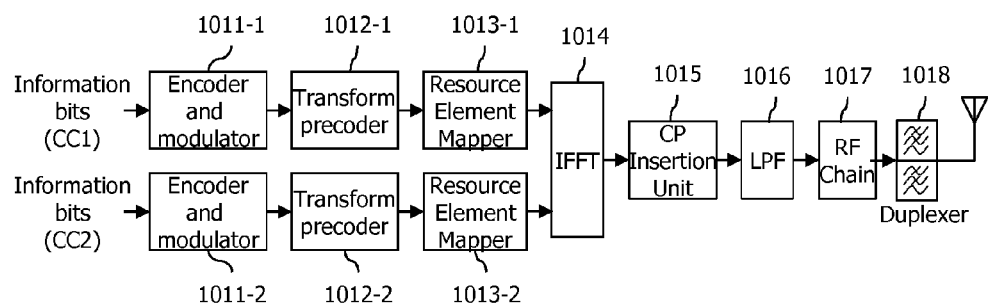
FIG. 10a exemplarily illustrates the structure of a transmitter for a contiguous intra-band CA, and FIG. 10b exemplarily illustrates the structure of a transmitter for an inter-band CA.
Figure 10B:
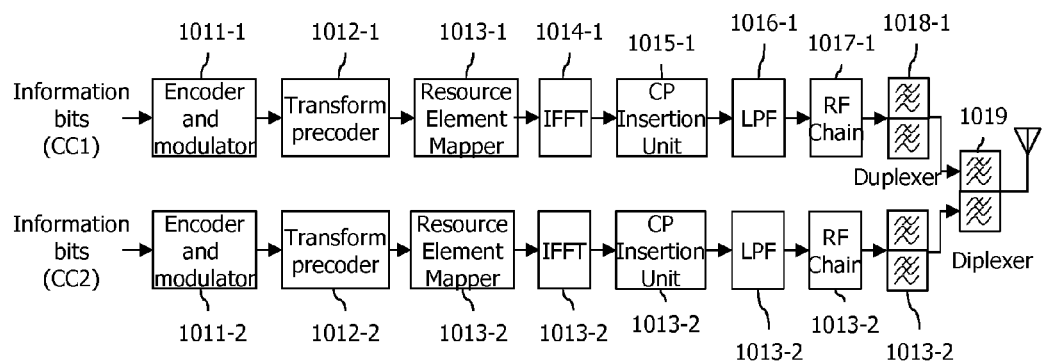

FIG. 10a exemplarily illustrates the structure of a transmitter for a contiguous intra-band CA, and FIG. 10b exemplarily illustrates the structure of a transmitter for an inter-band CA.

First, as may be seen with reference to FIG. 10a, the transmitter for an intra-band CA includes encoder and modulators 1101-1/1101-2 for a first CC CC1 and a second CC CC2, transform precoders 1012-1/1102-2, and resource element mappers 1013-1/1103-2. Furthermore, the transmitter includes an IFFT (inverse fast Fourier Transform) unit 1014, a CP (cyclic prefix) insertion unit 1015, an LPF (Low pass filter) 1016, an RF chain 1017, and a duplexer 1018. The resource element mapper 1013-1 for the first CC CC1 and the resource element mapper 1013-2 for the second CC CC2 are connected to the one IFFT unit 1014.

Each of the encoder and decoders 1011-1/1011-2 forms coded data by encoding received information bits according to a predetermined coding method for the first CC CC1 and the second CC CC2. The coded data is called a codeword. Next, each of the encoder and decoders 1011-1/1011-2 disposes the codeword in the form of a symbol that represents the location on a signal constellation. A modulation scheme is not limited.

Each of the transform precoders 1012-1/1102-2 processes the input symbol using an MIMO method according to multiple transmission antennas. For example, each of the transform precoders 1012-1/1102-2 may use codebook-based precoding.

Each of the resource element mappers 1013-1/1103-2 maps the symbol output by the transform precoder 230 to resource elements.

The IFFT unit 1014 performs IFFT (Inverse Fast Fourier Transform) on the symbol output by each of the resource element mappers 1013-1/1103-2.

The CP insertion unit 1015 inserts a CP (cyclic prefix) into the time domain symbol on which the IFFT has been performed.

The symbols into which the CPs have been inserted experience the LPF (Low pass filter) 1016, combined with carriers while passing through the RF chain 1017, and transmitted to an antenna via the duplexer 1018. The duplexer 1018 functions to separate a transmission (Tx) signal and a reception (RX) signal.

As described above, in the case of the transmitter supporting an intra-band consecutive CA, ODFM modulation through one IFFT unit 1014 is possible. Accordingly, the RF chain 1017 can also be solely implemented.

Meanwhile, as may be seen with reference to FIG. 10b, in the transmitter for an inter-band CA, IFFT units 1014-1/1104-2, CP insertion units 1015-1/1105-2, LPFs 1016-1/1106-2, RF chains 1017-1/1107-2, and duplexers 1018-1/1108-2 are separately present for the first CC CC1 and the second CC CC2.

Signals that have passed through the respective duplexers 1018-1/1108-2 are combined through the diplexer 1019. The combined signal is transmitted through an antenna. That is, the diplexer 1019 combines the first CC CC1 and the second CC CC2 upon transmission and separates the first CC CC1 and the second CC CC2 upon reception.

As described above, in the case of a transmitter supporting an inter-band CA, a baseband and an RF chain need to be placed in each CC due to the limit of a processing bandwidth.

Figure 11:
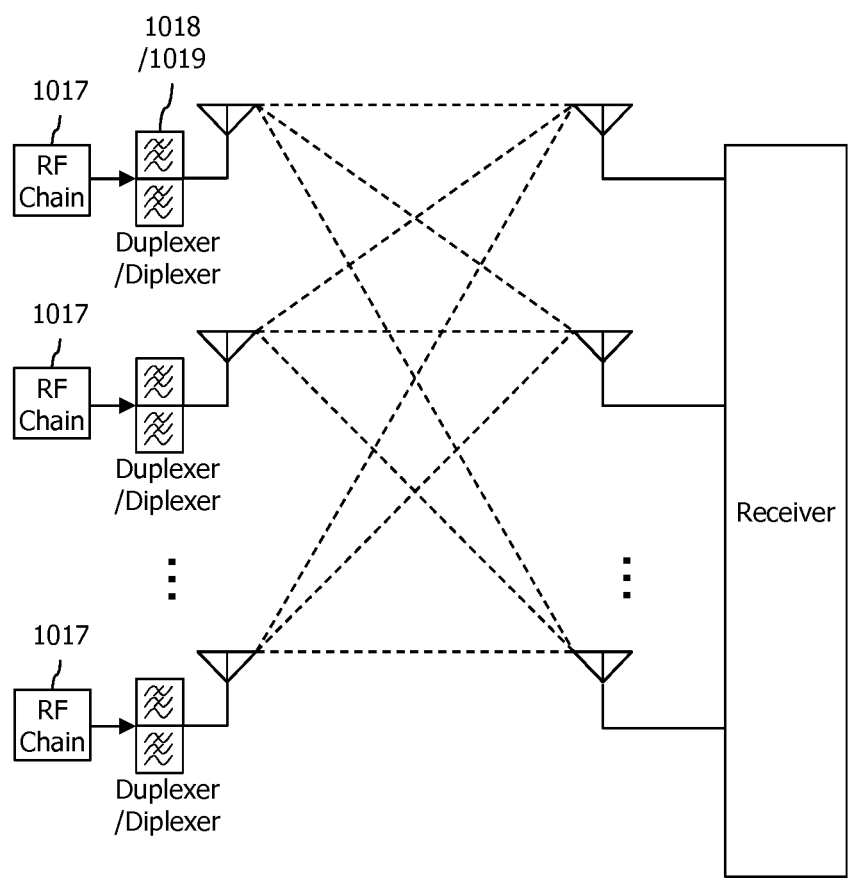
FIG. 11 is an exemplary diagram illustrating multiple antennas coupled to a transmitter illustrated in FIGS. 10a and 10b.

FIG. 11 is an exemplary diagram illustrating multiple antennas coupled to the transmitter illustrated in FIGS. 10a and 10b.

As may be seen with reference to FIG. 11, the multiple antennas may be coupled to the transmitter illustrated in FIG. 10a or 10b.

A multiple antenna technology can improve the data transfer rate in a specific range or increase a coverage range for a specific data transfer rate.

Furthermore, the multiple antenna technology includes a spatial diversity method capable of increasing transmission reliability using symbols passing through various channel paths and a spatial multiplexing method capable of increasing the transfer rate by simultaneously sending separate data streams through a plurality of transmission antennas using the plurality of transmission antennas.

However, there is a problem in that to implement both the multiple antenna technology and a CA technology in a terminal has a very complicated structure. That is, in order to graft in order to graft the multiple antenna technology, the RF chains 1017 corresponding to a maximum number of layers that can be supported need to be independently present. In other words, each of the transmitter illustrated in FIG. 10a and the transmitter illustrated in FIG. 10b has a very complicated structure because the number of transmitters corresponding to the number of antennas is required.

Furthermore, in order to support a CA, there is a need for an RF transceiver having an integrated structure which is capable of supporting all of a contiguous intra-band CA, an intra-band non-contiguous CA, and an inter-band CA depending on the frequency of each of communication operators. However, to support both the intra-band CA and the inter-band CA was impossible so far because the implementation of both the intra-band CA and the inter-band CA is very complicated.

As a result, in an MIMO environment, there is a need for research into a baseband processing unit and RF chain for a CA.

Figure 12:
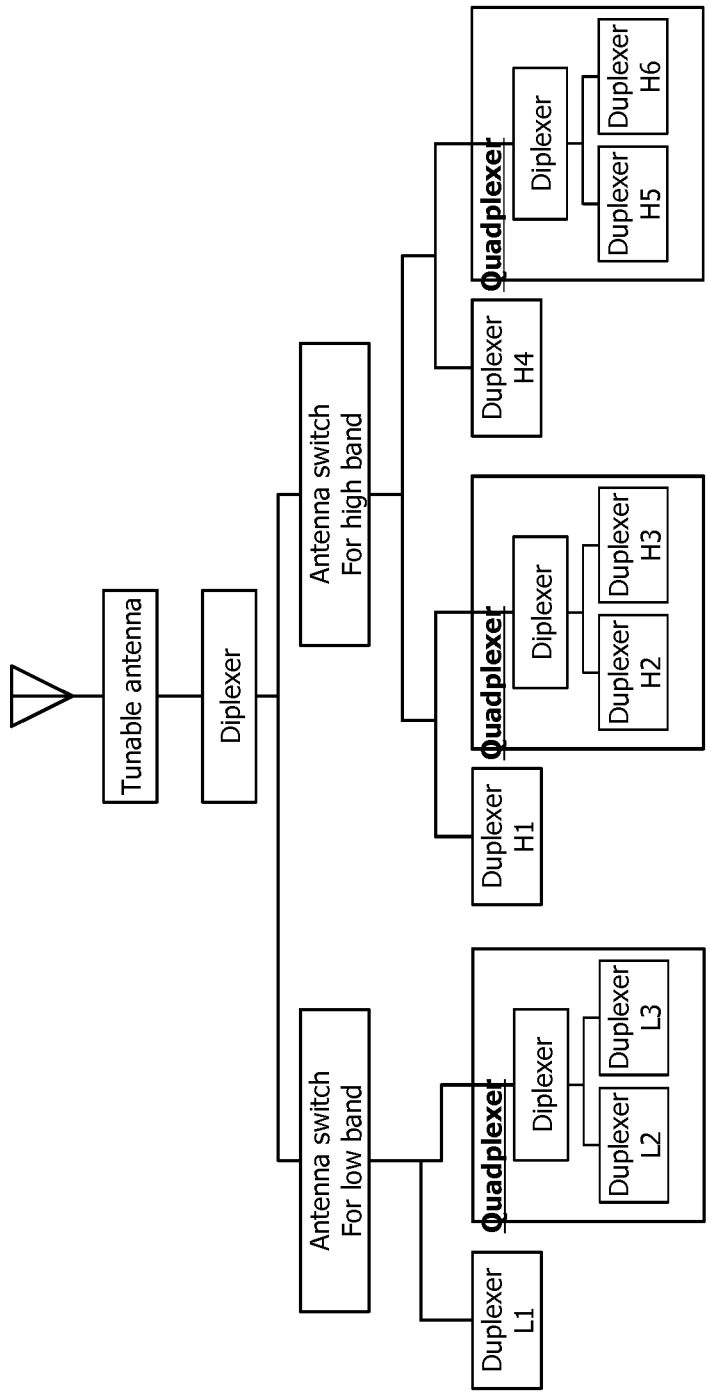
FIG. 12 is an exemplary diagram illustrating an RF structure capable of supporting both an inter-band CA and an intra-band CA in accordance with a first embodiment.

FIG. 12 is an exemplary diagram illustrating an RF structure capable of supporting both an inter-band CA and an intra-band CA in accordance with a first embodiment.

As described above, in accordance with the RF structure of a transmitter capable of supporting an intra-band CA and an inter-band CA, the RF structure of the transmitter was very complicated because the number of RF chains corresponding to the number of CCs is required. Furthermore, a band that an antenna can support was limited.

In accordance with the first embodiment illustrated in FIG. 12, several bands can be supported using a tunable antenna. That is, the tunable antenna may be varied according to several center frequencies. Furthermore, a multiple antenna technology can be easily implemented using several tunable antennas.

Specifically, in accordance with the first embodiment illustrated in FIG. 12, the tunable antenna is connected to a diplexer that aggregates/separates CCs. The diplexer is connected to an antenna switch for a low band and an antenna switch for a high band.

The antenna switch for a low band is connected to a duplexer and a quadplexer. The duplexer aggregates/separates transmission and reception based on the CC of a first low band L1. The quadplexer includes a combination of a diplexer and duplexers. The diplexer of the quadplexer aggregates/separates the CC of a second low band L2 and the CC of a third low band L3. The duplexer of the quadplexer aggregates/separates transmission and reception.

Meanwhile, the antenna switch for a high band may be connected to one or more duplexers and one or more quadplexers. In FIG. 12, the antenna switch for a high band has been illustrated as being connected to two duplexers and two quadplexers. The two duplexers aggregate/separate the transmission and reception of the CC of a first high band H1 and the CC of a fourth high band H4, respectively. Furthermore, the two quadplexers aggregate/separate the CCs of a second high band H2, third high band H3, fifth high band H5, and sixth high band H6.

As described above, in accordance with the RF structure of the first embodiment, both an inter-band CA and an intra-band CA can be supported.

However, in accordance with the structure illustrated in FIG. 12, a problem in that reception reference sensitivity is reduced or a problem in that transmission output is lost is generated due to additional several devices.

Furthermore, in accordance with the RF structure illustrated in FIG. 12, an inter-band carrier aggregation between a low band CC and a high band CC can be supported, but there is a problem in that a middle band CC is not supported.

Meanwhile, each of global communication operators uses several bands of Table in order to support 4G LTE service. Accordingly, as illustrated in Tables 2 and 3 below, a combination of aggregated carriers is very various. However, there is a problem in that a combination of various carriers illustrated in Tables 2 and 3 cannot be supported using the RF structure illustrated in FIG. 12.

TABLE 2

| Class | | Band combinations | Frequency | Communication operator | TIB [dB] | RIB [dB] |
|---|---|---|---|---|---|---|
| one UL inter-band CA | A1 | B1 + 8 (1UL) | 2.1G + 900M | Softbank Mobile | 0.3/0.3 | 0/0 |
| | | B2 + 12 (1UL) | 1.9G + 700M | US Cellular | | |
| | | B2 + 13 (1UL) | 1.9G + 700M | Verizon Wireless | | |
| | | B2 + B5 (1UL) | 1.9G + 800M | AT&T | | |
| | | B3 + 28 (1UL) | 1.8G + 700M | eAccess | | |
| | | B3 + 19 (1UL) | 1.8G + 800M | NTT DCM | | |
| | | B3 + 26 (1UL) | 1.8G + 800M | KT | | |
| | | B5 + B25 (1UL) | 800M + 1.9G | US Cellular | | |
| | | B23 + 29 (1UL) | 2.2G + 700M | Dish network | | |
| | | B1 + B26 (1UL) | 2.1G + 800M | KDDI | | |
| | | B1 + B18 (1UL) | 2.1G + 800M | KDDI | | |
| | | B5 + B7 (1UL) | 800M + 2.6G | LGU+ | | |
| | | B7 + B28 (1UL) | 2.6G + 800M | Telefonica | | |
| | | B12 + B25 (1UL) | 700M + 1.9G | US cellular | FFS | FFS |
| | | B25 + 26 (1UL) | 1.9G + 800M | Sprint | FFS | FFS |
| | A3 | B1 + 7 (1UL) | 2.1G + 2.6G | TeliaSonera | FFS | FFS |
| | | B39 + B41(1UL) | 1.9G + 2.6G | CMCC | FFS | FFS |
| | | B8 + B26 (1UL) | 900M + 800M | KT | FFS | FFS |
| | A4 | B2 + B4 (1UL) | 1.9G + 2.1G | T-Mobile USA | 0.5/0.5 | 0.3/0.3 |
| | A5 | B19 + B21 (1UL) | 800M + 1.4G | NTT DCM | 0.3/0.4 | 0/0 |
| | | B1 + B11 (1UL) | 2.1G + 1.4G | Softbank | FFS | FFS |
| | | B8 + B11 (1UL) | 900M + 1.4G | Softbank | FFS | FFS |

Table 2 relates to one uplink inter-band CA.

TABLE 3

| Class | | Band combinations | Frequency | Communication operator | TIB [dB] | RIB [dB] |
|---|---|---|---|---|---|---|
| Two UL inter-band CA | A1 | B1 + 5 (2UL) | 2.1G + 800M | LG U+ | FFS | FFS |
| | | B1 + B19 (2UL) | 2.1G + 800M | NTT DCM | FFS | FFS |
| | | B3 + 20 (2UL) | 1.8G + 800M | Vodafone | FFS | FFS |

TABLE 3-continued

| Class | | Band combinations | Frequency | Communication operator | TIB [dB] | RIB [dB] |
|---|---|---|---|---|---|---|
| | A2 | B3 + 8 (2UL) | 1.8G + 900M | KT | FFS | FFS |
| | | B4 + 12(2UL) | 2.1G + 700M | Cox Comm. | FFS | FFS |
| | | B4 + 17(2UL) | 2.1G + 700M | AT&T | FFS | FFS |
| | A3 | B1 + 7 (2UL) | 2.1G + 2.6G | TeliaSonera | FFS | FFS |
| | | B3 + B7 (2UL) | 1.7G + 2.6G | TeliaSonera | FFS | FFS |
| | | B4 + B7 (2UL) | 1.7G + 2.6G | Rogers Wireless | FFS | FFS |
| | | B5 + B12 (2UL) | 800M + 700M | US cellular | FFS | FFS |
| | | B5 + B17 (2UL) | 800M + 700M | AT&T | FFS | FFS |
| | A4 | B3 + 5 (2UL) | 1.8G + 800M | SKT | FFS | FFS |
| | | B2 + B4 (2UL) | 1.9G + 2.1G | T-Mobile USA | FFS | FFS |
| | | B7 + B20 (2UL) | 2.6G + 800M | Huawei | FFS | FFS |
| | | B3 + B19 (2UL) | 1.8G + 800M | NTT DCM | FFS | FFS |
| | | B3 + B26 (2UL) | 1.8G + 800M | KT | FFS | FFS |
| | A5 | B1 + B21 (2UL) | 2.1G + 1.4G | NTT DCM | FFS | FFS |
| | | B19 + B21 (2UL) | 800M + 1.4G | NTT DCM | FFS | FFS |

Table 3 illustrates one uplink inter-band CA.

If the operating band illustrated in Table 1 is 1 GHz or less, it is classified as a low band. If the operating band illustrated in Table 1 is 1 GHz or more to 1.7 GHz or less, it is classified as a middle band. If the operating band illustrated in Table 1 is 1.7 GHz or more, it is classified as a high band. Furthermore, in Tables 2 and 3, a combination of a low band and a high band is classified as class1 and class2, and a combination of a low band and a low band or a combination of a high band and a high band is classified as class3 and class4. Furthermore, the classification of class1 and class2 and the classification of class3 and class4 are performed depending on whether a harmonic component or intermodulation distortion (IMD) component is present in each band when two bands are simultaneously transmitted.

This is described again as follows.

A1: An inter-band carrier aggregation of a low band and a high band (harmonic and IMD component not present)

A2: An inter-band carrier aggregation of a low band and a high band (harmonic and IMD component present)

A3: An inter-band carrier aggregation between a low band and a low band or between a high band and a high band (harmonic and IMD component not present)

A4: An inter-band carrier aggregation between a low band and a low band or between a high band and a high band (harmonic and IMD component present)

A5: Combinations other than A1~A4

A Brief Description of a Second Embodiment and Third Embodiment Proposed in this Specification As described above, in accordance with the first embodiment, an inter-band carrier aggregation between a low band CC and a high band CC can be supported, but there is a problem in that a middle band CC is not supported. Accordingly, the second embodiment proposes an RF structure capable of also supporting a middle band CC.

Furthermore, as described above, in order to overcome a loss of reception reference sensitivity caused because devices, such as a diplexer, a quadplexer, a harmonic filter for removing harmonics, and an antenna switch, are additionally used, in the third embodiment, a low noise amplifier (LNA) is added, but is placed after a duplexer. Accordingly, reception reference sensitivity can be efficiently improved. Specifically, this is described with reference to FIGS. 13a to 13c.

Figure 13A:
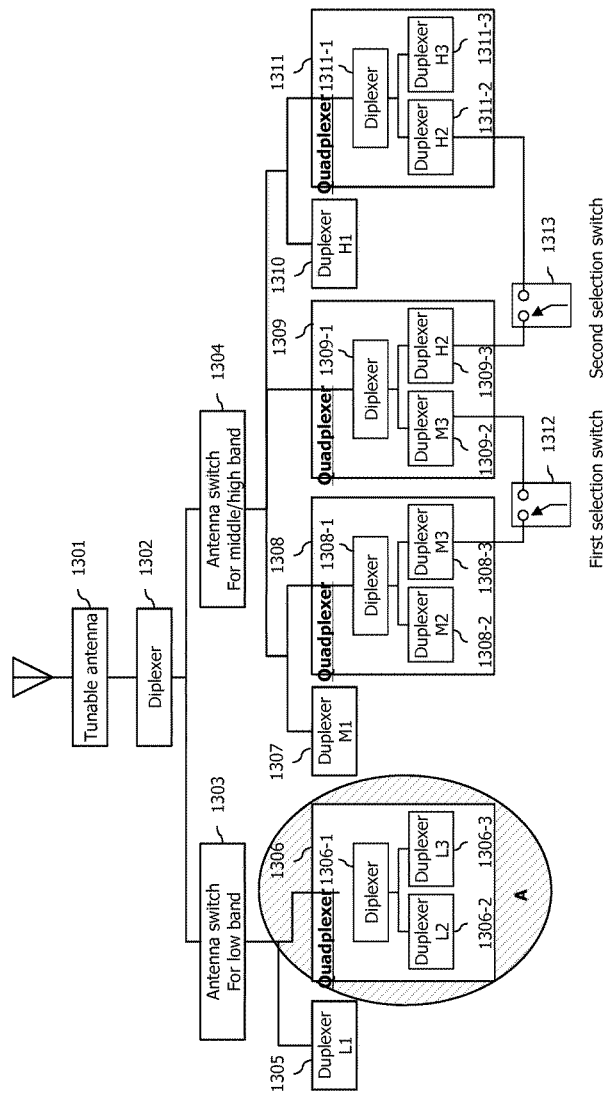
FIG. 13a is an exemplary diagram illustrating an RF structure capable of supporting both an inter-band CA and an intra-band CA in accordance with a second embodiment.

FIG. 13a is an exemplary diagram illustrating an RF structure capable of supporting both an inter-band CA and an intra-band CA in accordance with a second embodiment.

The RF structure illustrated in FIG. 13a is designed for an inter-band carrier aggregation in order to support a multi-band and a multi-mode and also improved in order to also support an intra-band carrier aggregation.

Devices included in the RF structure illustrated in FIG. 13a are configured to process a maximum of 40 MHz in one operating band in order to support an intra-band contiguous CA.

Furthermore, in accordance with the second embodiment illustrated in FIG. 13a, the CCs of several bands, such as the CC of a low band, the CC of a middle band, and the CC of a high band, can be supported using a tunable antenna 1301. The tunable antenna 1301 is configured according to a combination of supported bands, and thus can support all of inter-band carrier aggregations of a combination of a low band and a high band, a combination of a low band and a low band, a combination of a high band and a high band.

The tunable antenna 1301 is connected to a diplexer 1302 that aggregates/separates CCs. The diplexer 1302 is connected to a first antenna selection switch 1303 for a low band and a second antenna selection switch 1304 for a middle band/high band.

The first antenna selection switch 1303 for a low band is connected to a low band subcarrier processing unit that aggregates and separates several subcarriers of a low band.

The low band subcarrier processing unit includes a duplexer 1305 and a quadplexer 1306. The duplexer 1305 aggregates/separates transmission and reception based on the CC of a first low band L1. The quadplexer 1306 includes a diplexer 1306-1 and at least two duplexers 1306-2/1306-3. The diplexer 1306-1 of the quadplexer 1306 aggregates/separates the CC of a second low band L2 and the CC of a third low band L3. The duplexer 1306-2 of the quadplexer 1306 aggregates/separates the transmission and reception of the CC of the second low band L2. Likewise, the duplexer 1306-3 of the quadplexer 1306 aggregates/separates the transmission and reception of the CC of the third low band L3.

Meanwhile, the second antenna selection switch 1304 for a middle band/high band is connected to a middle band processing unit that aggregates and separates several subcarriers of a middle band. Furthermore, the second antenna selection switch 1304 is connected to a high band subcarrier processing unit that aggregates and separates several subcarriers of a high band.

First, the middle band subcarrier processing unit includes a duplexer 1307 and a quadplexer 1308. The duplexer 1307 aggregates/separates transmission and reception based on the CC of a first middle band M1. The diplexer 1308-1 of the quadplexer 1308 aggregates/separates the CC of a second middle band M2 and the CC of a third middle band M3. The duplexer 1308-2 of the quadplexer 1308 aggregates/separates the transmission and reception of the CC of the second middle band M2. Likewise, the duplexer 1308-3 of the quadplexer 1308 aggregates/separates the transmission and reception of the CC of the third middle band M3.

The high band subcarrier processing unit includes a duplexer 1310 and a quadplexer 1311. The duplexer 1310 aggregates/separates transmission and reception based on the CC of a first high band H1. The diplexer 1311-1 of the quadplexer 1311 aggregates/separates the CC of a second high band H2 and the CC of a third high band H3. The duplexer 1311-2 of the quadplexer 1311 aggregates/separates the transmission and reception of the CC of the second high band H2. Likewise, the duplexer 1311-3 of the quadplexer 1311 aggregates/separates the transmission and reception of the CC of the third high band H3.

Meanwhile, the second antenna selection switch 1304 is connected to a middle/high band subcarrier simultaneous processing unit that aggregates and separates the subcarriers of a middle band and the subcarriers of a high band.

The middle/high band subcarrier simultaneous processing unit includes a quadplexer 1309. The diplexer 1309-1 of the quadplexer 1309 aggregates/separates the CC of a third middle band M3 and the CC of a second high band H2. The duplexer 1309-2 of the quadplexer 1309 aggregates/separates the transmission and reception of the CC of a third middle band M3. Likewise, the duplexer 1309-3 of a quadplexer 1309 aggregates/separates the transmission and reception of the CC of the second high band H2.

Furthermore, the duplexer 1308-3 and the duplexer 1309-2 are connected to a first selection switch 1312. The first selection switch 1312 selects a duplexer that belongs to the two duplexers 1308-3 and 1309-2 for the third middle band M3 and that has better performance. Likewise, the duplexer 1309-3 and the duplexer 1311-2 are connected to a second selection switch 1313. The second selection switch 1313 selects a duplexer that belongs to the two duplexers 1309-3 and 1311-2 for the second high band H2 and that has better performance.

As described above, if the diplexer 1302 integrally separates/aggregates a middle band and a high band, the antenna switch 1304 aggregates/separates a middle band and a high band. The quadplexers enable the CA of a low band and a low band, the CA of a middle band and a middle band, and the CA of a high band and a high band.

In accordance with the RF structure of the second embodiment, there is an advantage in that the CC of a middle band can be supported, but there is a disadvantage in that an additional loss is generated due to the antenna switch, the diplexer, and the quadplexer. For example, a loss of a maximum of 5.8 dB or more may be generated by taking into consideration all of a loss of the antenna switch, a loss of the diplexer, and a loss of the quadplexer.

For example, in general, an RF structure supporting the CA of various bands represents noise figures, such as Table 4. Such a value is an important factor that determines the characteristics of a device. In general, the value indicates an actually measured value according to measurement.

TABLE 4

| | Diplexer | Antenna switch | Quadplexer | | RFIC | Noise FIGURE |
|---|---|---|---|---|---|---|
| | | | Diplexer | Duplexer | | |
| Gain | −0.3 dB | −0.3 dB | −0.7 dB | −2.2 dB | 90 dB | |
| Loss | 0.3 dB | 0.3 dB | 0~0.8 dB | 2.2 dB | 3 dB | 5.8~6.6 dB |

Furthermore, the RF structure supporting the CA of various bands has reference sensitivity levels, such as Table 5.

TABLE 5

| Antenna | Noise figure | Reception sensitivity | Total sum of reception sensitivity |
|---|---|---|---|
| Primary | 6.5 dB | −96 dB | −98.86 dB |
| Secondary | 6.8 dB | −95.7 dB | |

Accordingly, a third embodiment capable of compensating for a loss is described below.

Figure 13B:
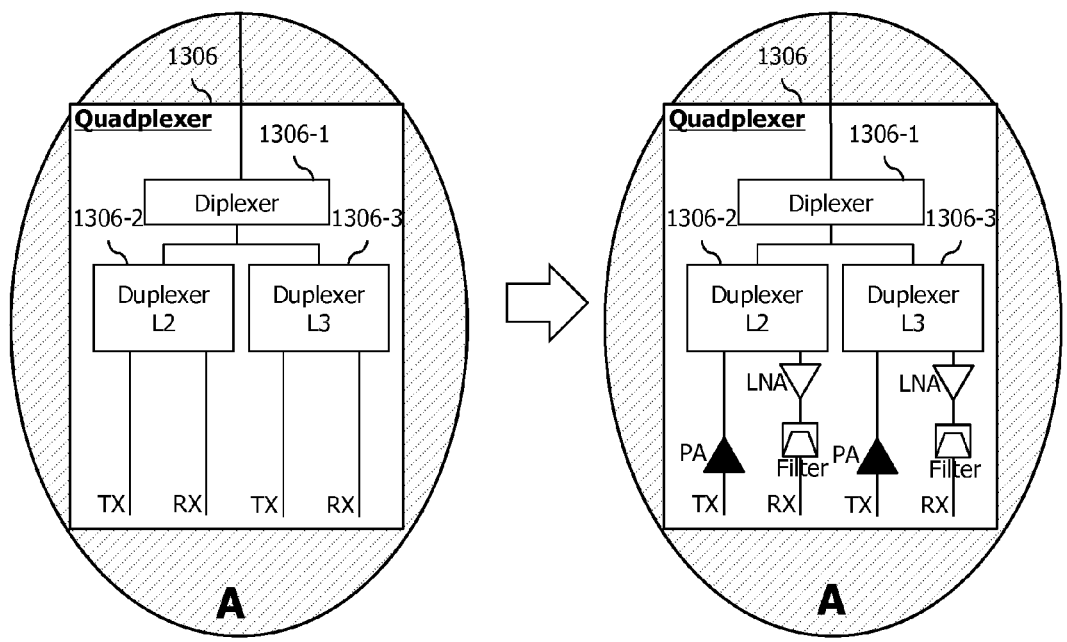
FIG. 13b is an exemplary diagram illustrating an example in which the structure of a quadplexer illustrated in an area A of FIG. 13a has been improved in accordance with a third embodiment.

FIG. 13b is an exemplary diagram illustrating an example in which the structure of the quadplexer illustrated in the area A of FIG. 13a has been improved in accordance with the third embodiment.

The structure of the area A illustrated in FIG. 13a is enlarged and illustrated on the left of FIG. 13b, and an improved structure in accordance with the third embodiment is illustrated on the right of FIG. 13b.

The left and right of FIG. 13b are compared with each other and described. In accordance with the third embodiment, in order to compensate for a reduction of transmission power, a Power Amplifier (PA) is connected to an input line for the transmission signal of each of the duplexers 1306-2/1306-3. Furthermore, in order compensate for a loss of reception reference sensitivity, an LNA is connected to an output line for the reception signal of each of the duplexers 1306-2/1306-3, and a filter is connected to the LNA. The filter functions to remove harmonic components.

As described above, an increase of a noise figure can be minimized and reception sensitivity can be increased by connecting the LNAs to the respective output lines of the duplexers 1306-2/1306-3.

The improved structure of the third embodiment illustrated on the right of FIG. 13b has noise figures, such as Table 6

TABLE 6

| Proposed RF structure | Antenna Diplexer | switch | Quadplexer Diplexer | Duplexer | RFIC | Noise FIGURE | Intraband CA structure | Diplexer |
|---|---|---|---|---|---|---|---|---|
| Gain | −0.3 dB | −0.3 dB | −0~−0.8 dB | −2.2 dB | 15 dB | 2 dB | 90 dB | |
| Loss | 0.3 dB | 0.3 dB | 0~0.8 dB | 2.2 dB | 1 dB | 2 dB | 3 dB | 4.0~4.8 |

Furthermore, the improved structure of the third embodiment illustrated on the right of FIG. 13b has reference sensitivity levels, such as Table 7.

TABLE 7

| Antenna | Noise figure | Reception sensitivity | Total sum of reception sensitivity |
|---|---|---|---|
| Primary | 4.7 dB | −97.8 dB | −102.43 dB |
| Secondary | 1.9 dB | −100.6 dB | |

Meanwhile, FIG. 13b illustrates only the quadplexer 1306 of the area A illustrated in FIG. 13a, but other quadplexers 1308, 1309, 1311 illustrated in FIG. 13a may also be improved into the structure illustrated in FIG. 13b.

Meanwhile, if UL-MIMO is simultaneously supported, each antenna may have the RF structure of FIG. 13a and the quadplexer structure on the right of FIG. 13b. If UL-MIMO is not supported, however, a primary antenna may have the RF structure of FIG. 13a and the quadplexer structure on the right of FIG. 13b, and a secondary antenna may have the RF structure illustrated in FIG. 14a and the quadplexer structure of on the right of FIG. 14.

Figure 14A:
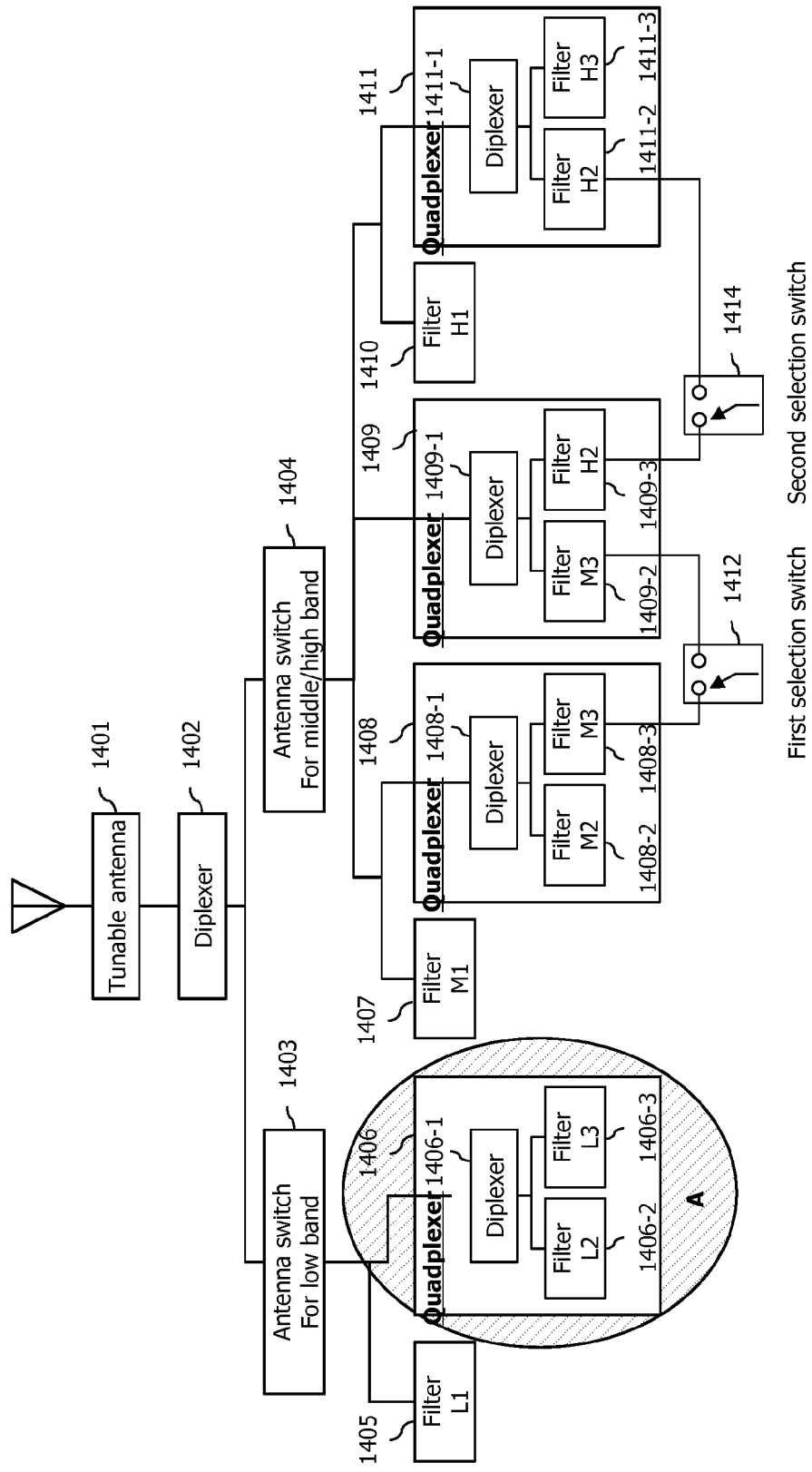
FIG. 14a is an exemplary diagram illustrating an RF structure capable of supporting both an inter-band CA and an intra-band CA in accordance with a fourth embodiment.
Figure 14B:
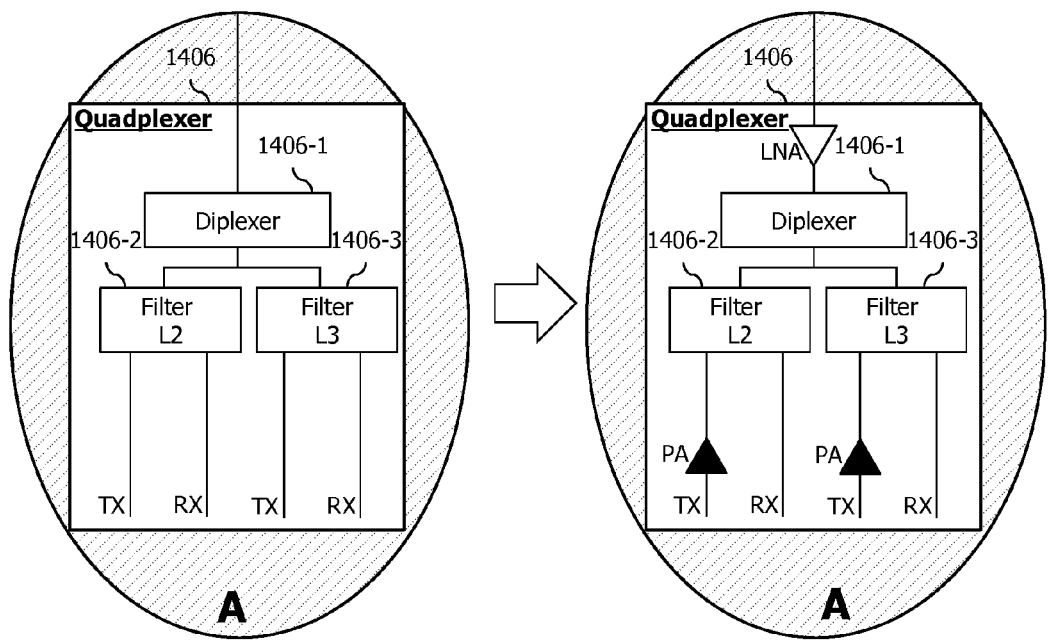
FIG. 14b is an exemplary diagram illustrating an example in which the structure of a quadplexer illustrated in an area A of FIG. 14a has been improved in accordance with a fifth embodiment.

FIG. 14a is an exemplary diagram illustrating an RF structure capable of supporting both an inter-band CA and an intra-band CA in accordance with a fourth embodiment, and FIG. 14b is an exemplary diagram illustrating an example in which the structure of a quadplexer illustrated in an area A of FIG. 14a has been improved in accordance with a fifth embodiment.

As illustrated in FIG. 14a, in accordance with the fourth embodiment, the duplexers within the RF structure according to the third embodiment of FIG. 13a may be replaced with filters.

The structure of the quadplexer 1406 of an area A illustrated in FIG. 14a is enlarged and illustrated on the left of FIG. 14b, and the structure of an improved quadplexer 1406 in accordance with the fifth embodiment is illustrated on the right of FIG. 14b.

The left and right of FIG. 14b are compared with each other and described. In accordance with the fifth embodiment, in order to compensate for a reduction of transmission power, a Power Amplifier (PA) is connected to an input line for the transmission signal of each of the filters 1406-2/1406-3 of the quadplexer 1406. Furthermore, in order to compensate for a loss of reception reference sensitivity, a Low Noise Amplifier (LNA) may be connected to the front end line of a diplexer 1406-1.

As described above, in accordance with the fifth embodiment, only one LNA is used in the quadplexer. This is suitable for a terminal not using UL-MIMO.

Although preferred embodiments of the present invention have been illustratively described, the scope of the present invention is not limited to only the specific embodiments, and the present invention may be modified, changed, or improved in various forms within the spirit of the present invention and a category written in the claims.

What is claimed is:

1. A terminal, comprising:
a band-adjustable tunable antenna;
a diplexer which is connected to the tunable antenna and aggregate and separate subcarriers;
a first antenna switch which is connected to the diplexer and aggregate and separate low band subcarriers and middle band and high band subcarriers;
a second antenna switch which is connected to the diplexer and selects middle band and the high band subcarriers;
a low band subcarrier processing unit which is connected to the first antenna switch and several aggregate and separate subcarriers of a low band;
a middle band subcarrier processing unit which is connected to the second antenna switch and several aggregate and separate subcarriers of a middle band; and
a high band subcarrier processing unit which is connected to the second antenna switch and several aggregate and separate subcarriers of a high band,
wherein the low band subcarrier processing unit is connected to a low noise amplifier in order to prevent a loss of reception sensitivity and an increase in noise level generated on a reception path of the diplexer, the first antenna switch, and the low band subcarrier processing unit,
wherein the low band subcarrier processing unit comprises:
a low band duplexer which is connected to the first antenna switch and aggregates and separates a transmission and reception of a first low band subcarrier; and
a low band quadplexer which is connected to the first antenna switch, aggregates and separates a second low band subcarrier and a third low band subcarrier, and aggregates and separates transmission and reception, and
wherein the middle band subcarrier processing unit or the high band subcarrier processing unit is connected to a low noise amplifier in order to prevent a loss of reception sensitivity and an increase in noise level generated on a reception path of the diplexer, the second antenna switch, and the middle band subcarrier processing unit or the high band subcarrier processing unit.

2. The terminal of claim 1, wherein the middle band subcarrier processing unit comprises:
a middle band the duplexer which is connected to the second antenna switch and aggregates and separates a transmission and reception of a first middle band subcarrier; and
a middle band quadplexer which is connected to the second antenna switch, aggregates and separates a second middle band subcarrier and a third middle band subcarrier, and aggregates and separates transmission and reception.

3. The terminal of claim 2, wherein the high band subcarrier processing unit comprises:
- a high band duplexer which is connected to the second antenna switch and aggregates and separates a transmission and reception of a first high band subcarrier; and
- a high band quadplexer which is connected to the second antenna switch, aggregates and separates a second high band subcarrier and a third high band subcarrier, and aggregates and separates transmission and reception.

4. The terminal of claim 3, further comprising a middle band and high band subcarrier simultaneous processing unit which is connected to the second antenna switch and aggregates and separates subcarriers of a middle band and subcarriers of a high band.

5. The terminal of claim 4, wherein the middle band and high band subcarrier simultaneous processing unit comprises a middle/high band quadplexer which is connected to the second antenna switch, aggregates and separates a third middle band subcarrier and a second high band subcarrier, and aggregates and separates transmission and reception.

6. The terminal of claim 5, further comprising:
- a first selection switch which selects any one of third middle band subcarriers by the middle band quadplexer and third middle band subcarriers by the middle/high band quadplexer; and
- a second selection switch which selects any one of second high band subcarriers by the high band quadplexer and second high band subcarriers by the middle/high band quadplexer.

7. The terminal of claim 3, wherein one or more of the low band quadplexer, the middle band quadplexer, and the high band quadplexer comprise:
- a diplexer; and
- at least two duplexers connected to the diplexer.

8. The terminal of claim 7, wherein:
- the low noise amplifier is connected to an output lint for a reception signal of the duplexer within the quadplexer,
- a filter is connected to the low noise amplifier, and
- a power amplifier is connected to an input line for a transmission signal of the duplexer within the quadplexer.

9. The terminal of claim 3, wherein one or more of the low band quadplexer, the middle band quadplexer, and the high band quadplexer comprise:
- a diplexer; and
- at least two filters connected to the diplexer.

10. The terminal of claim 7, wherein:
- the low noise amplifier is connected to a front end of the diplexer within the quadplexer, and
- a power amplifier is connected to an input line for a transmission signal of a filter within the quadplexer.

* * * * *